Inventors
Francis DuPont Ammen
Paul E. Schneider
By Lyon & Lyon
Attorneys

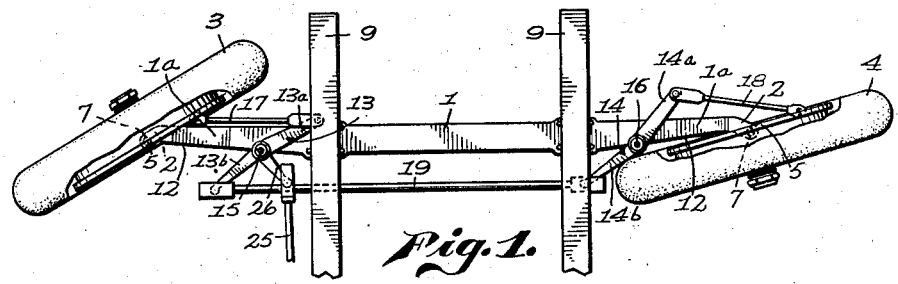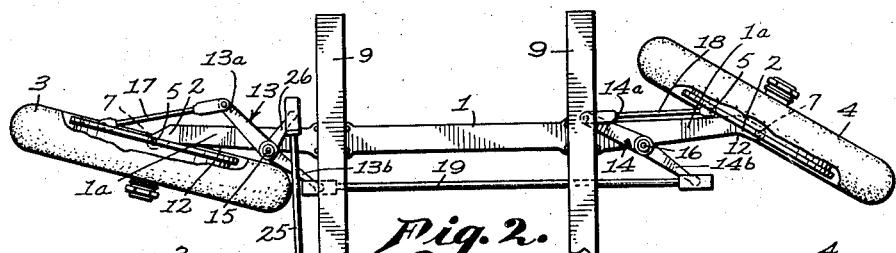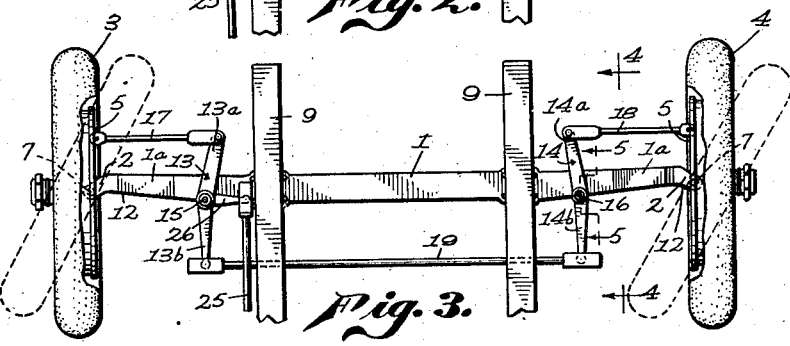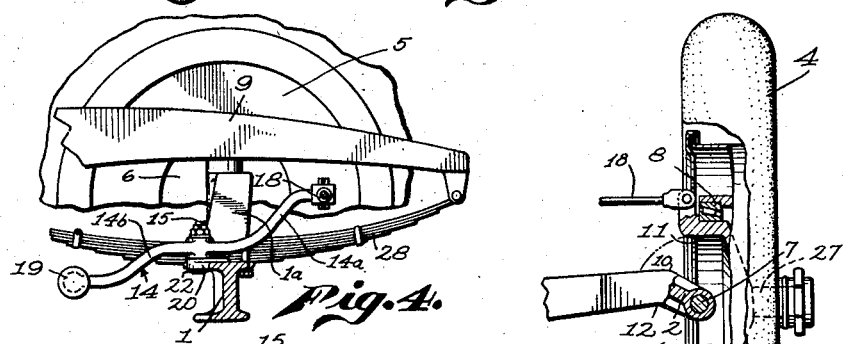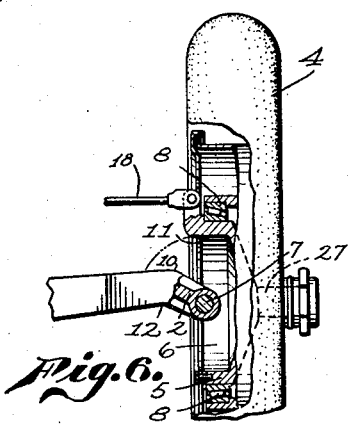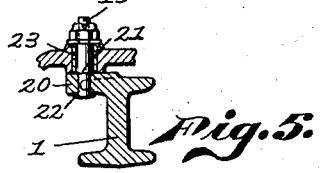

Patented July 5, 1938

2,122,924

UNITED STATES PATENT OFFICE 2,122,924

AUTOMOBILE STEERING GEAR

Francis Du Pont Ammen and Paul Edward Schneider, Los Angeles, Calif.; said Schneider assignor to said Ammen Application April 1, 1935, Serial No. 14,054

10 Claims. (Cl. 280—95)

This invention relates to automobile steering gear and particularly to that type disclosed in Patent No. 1,974,036, granted September 18, 1934. The construction disclosed in that patent was such as to enable one of the front wheels to have a relatively great swing in one direction to increase dirigibility of the car in one direction, as described in the patent, to facilitate parking the car against a right-hand curb by developing a relatively short steering radius in turning to the right. But the construction disclosed in the patent did not increase the angle of swing of the wheels in turning to the left.

In the construction disclosed in the patent the axle member was provided on the right side with an inclined steering head on which the right forward wheel was mounted, and while this inclined steering head increased the angle of swing in one direction, it actually reduced the angle of swing of the right wheel in swinging toward the left.

An object of the present invention is to provide a construction for the axle member and steering gear which will enable both the front wheels to have an increased swinging movement in steering in either direction, and to provide a construction operating to give a relatively increased swinging movement of the right wheel as compared with the left wheel, when steering to the right; and a relatively increased swinging movement of the left wheel as compared with the right wheel, when steering to the left. This gives the car a relatively short steering radius in steering in either direction, and also enables the car to be parked with equal facility against a right-hand curb or a left-hand curb.

In the patent referred to, in steering the car toward the left, the link attached to the left wheel and the lever for operating the same, developed a relatively short virtual lever arm at the wheel for rotating it. In other words, there is a tendency for the pivot connection between the operating link and the wheel to approach a "dead center" condition. One of the objects of this invention is to provide a construction which will overcome this objection, and in which the operating parts have such relation that even in extreme steering positions of the wheels a satisfactory virtual lever arm will always be maintained so that there is no tendency for any of the pivoted parts to approach a "dead center" condition.

In the patent, the steering gear involved the use of pivot pins for the steering levers mounted on the axle, which pins rotated in the operation of the steering gear. One of the objects of this invention is to provide a construction which will attain the desired relatively increased swing of the wheel on the side of the car toward which the car is being steered, but without necessitating the use of rotating pins mounted on the axle for connecting the steering levers.

A further object of the invention is to produce an automobile steering gear having a relatively short steering radius when turned toward the right or toward the left, in small angular swings of the wheels.

Further objects of the invention will appear hereinafter.

The invention consists in the novel parts and combinations of parts to be described hereinafter, all of which contribute to produce an efficient automobile steering gear.

A preferred embodiment of the invention is described in the following specification, while the broad scope of the invention is set forth in the appended claims.

In the drawings:

Fig. 1 is a fragmentary plan of the forward end of a chassis, illustrating the steering gear, with the parts in the relation which they have when the wheels are in an extreme position for steering to the right.

Fig. 2 is a view similar to Fig. 1, but showing the wheels in their extreme position for steering to the left.

Fig. 3 is a similar view, but showing the wheels in their neutral position.

Fig. 4 is a vertical section on the line 4—4 of Fig. 3 on an enlarged scale, with parts broken away, and illustrating the mounting of the actuating levers.

Fig. 5 is a vertical section upon an enlarged scale about on the line 5—5 of Fig. 3, further illustrating details of the lever mountings.

Fig. 6 is a fragmentary plan and partial section of the right front wheel and illustrating details of the construction enabling an increased swinging movement of the wheels in steering or parking the car.

Figure 7:
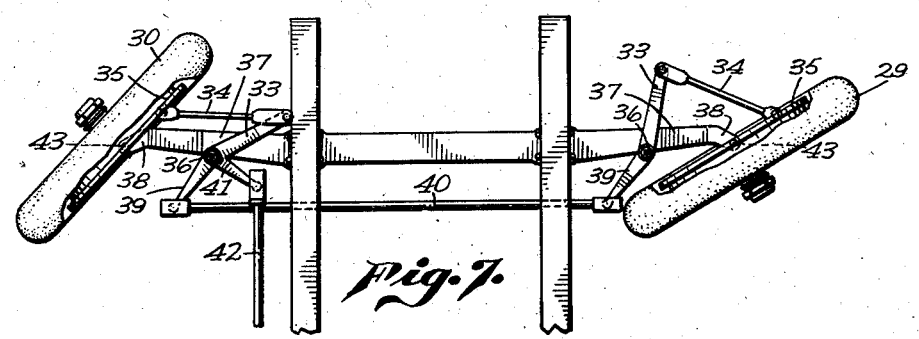
Fig. 7 is a plan similar to Fig. 1, but illustrating an embodiment of the invention that enables the car to develop a relatively short steering radius for a relatively small swing of the wheels. The wheels are shown in an extreme position for steering to the right.

In practicing our invention, the car is provided with a forward axle member 1, which is preferably in the form of a forging having the usual I form in vertical section.

At each end of the axle we provide an inclined steering head 2, which is preferably formed as an integral part of the axle by bending its ends in a substantially horizontal plane, and so that the steering head extends in a rearward direction and inclined at an angle to the longitudinal axis of the axle member.

The forward wheels, 3 and 4, are mounted for rotation on substantially vertical axes respectively at the ends of the inclined steering heads. In order to accomplish this we prefer to employ knuckles or knuckle-heads, 5, having the characteristics of the knuckle-heads described in the said Patent No. 1,974,036. Preferably each of these knuckle-heads is of shell form, and has a chamber, 6, on its inboard side to receive the steering head to which it is attached by a nearly vertical king-pin, 7. The wheel is preferably mounted on a large bearing, 8, on the outside of the knuckle-head, so that the plane of the wheel is substantially, or nearly, in line with the axis of the king-pin. The axis of the king-pin is inclined slightly from the vertical line, in accordance with the usual practice. And the plane of the wheel is displaced slightly in an outward direction with respect to the king pin to give caster effect in steering. Also, the plane of the wheel may be inclined slightly from the vertical to give camber by locating the wheel so that its plane is displaced slightly in an outboard direction with respect to the axis of the king-pin. Furthermore, in forming the axle, the outer end portion beyond the adjacent side frame bar, 9, is offset forwardly, so as to have the axes of the king-pins substantially in line with the longitudinal axis of the axle.

In accordance with the invention, each steering head, 2, is made relatively short, so that the distance from the center of the king-pin to the angle 10 (see Fig. 6) is less than the horizontal distance from the king-pin center to the adjacent inner face, 11, of the knuckle-head. This gives increased clearance for the right wheel in turning to the left, and increased clearance for the left wheel in swinging to the right.

Of course, on the rear side of the axle, by reason of the bent ends, a wide "notch" or pocket, 12, is formed, that gives increased clearance for the wheels in swinging in the other direction. The result is that the car has increased dirigibility in both directions, as indicated in Figs. 1 and 2.

The wheels are connected together by steering mechanism operating to give increased movement of the right wheel as compared with that of the left wheel in turning to the right, and vice versa, as illustrated in Figs. 1 and 2.

This mechanism for swinging the wheels in steering preferably includes two actuating levers, 13 and 14, having forward arms, 13a and 14a respectively, and including two tail-arms or tail levers, 13b and 14b, integral with their corresponding forward arms. These levers 13 and 14 are mounted on pivot pins, 15 and 16, that are preferably located adjacent to the rear edge of the axle. The forward ends of the arms 13a and 14a are connected by links, 17 and 18 respectively, with the knuckle heads, 5.

By locating the pins, 15 and 16, as far as possible toward the rear, a satisfactory "virtual" steering arm or leverage is maintained in the connection to the knuckle-head in extreme positions of the steering mechanism. Locating these pins at the rear edge of the axle 1 is also advantageous as it avoids the necessity for employing rocking pins for connecting the steering levers, as employed in the patent referred to above. Hence, the forward arm and the rear arm of each lever, 13 and 14, can be made integral; each forward arm is bent and offset upwardly to bring its forward end to about the level of the axis of the bearing, 8; and each rear arm is bent and offset downwardly to connect with a cross-link, 19, which is part of the means that we prefer to employ for connecting the wheels across the car.

Each pin, 15, is preferably seated in a drilled opening in a boss, 20, formed on the axle. The pin preferably has a shoulder, 21, to seat on the upper face of the boss, and its lower end projects slightly below the lower flange of the axle, at which point a weld, 22, is made. The hub of each of the actuating levers, 13 and 14, is preferably provided with a bushing, 23, which can be replaced when worn by rocking on the pin. A nut and washer may be employed for holding each lever on its pin, 15.

The forward arms, 13a and 14a, preferably incline inwardly slightly in a forward direction (see Fig. 3), but the rear arms, 13b and 14b, may extend substantially parallel with the front-and-rear axis of the chassis in their neutral position, as indicated in Fig. 3.

The links, 17 and 18, are preferably substantially parallel to the axle, 1, and their outer ends are attached to short arms respectively, that project forwardly from the forward portions of the knuckle-heads, 5.

Any suitable means may be provided for imparting the steering movement to the steering mechanism. It is obvious that a connection can be made into the cross-link, 19, in accordance with the new construction used in some cars, wherein the drag-link is located in a suitable position between the side bars. In the present instance we have illustrated a drag-link, 25, located to the left of the left frame bar, 9, the forward end of this link being attached to an arm, 26, projecting inwardly from the hub of the left actuating lever 13.

As in the patent referred to above, the outboard end of each knuckle-head is preferably provided with a short spindle, 27, on which a steadying bearing is provided for the wheel.

In either extreme position of the wheels the end of one of the arms, 13a, or 13b, will move in under the adjacent frame bar, 9, and between it and the adjacent side spring, 28. However, there is no objection to this because the wheels will never be in such an extreme position when running on a roadway, but only when parking the car or directing at slow speed around an obstacle in its path.

The use of the relatively short steering heads, 2, and the relatively long inclined axle extensions, 1a, that connect the steering heads to the axle body, is most advantageous, not only because it enables the swing of the wheels to be greatly increased for steering, but also for the reason that for a given amount of maximum swing for the wheels, the inside diameter of the knuckle-heads can be made smaller, as compared with the diameter necessary in the patented construction referred to above. This would enable the diameter of the bearings, 8, to be greatly reduced in building a car with a short steering radius for turning, and in which the wheels could assume such extreme steering positions as those indicated in Figs. 1 and 2. The capacity for assuming the extreme positions illustrated particularly adapts the car for being parked in a narrow space against a curb, in the manner described in the said patent, that is, by backing the car in to the curb, throwing the wheels over to an extreme position, as in Fig. 1, and then putting the car drive in "low" to turn the car sharply in toward the curb.

The axes of the pins, 15, should not be exactly vertical, but should be substantially parallel with the axes of their corresponding king pins.

Figure 8:
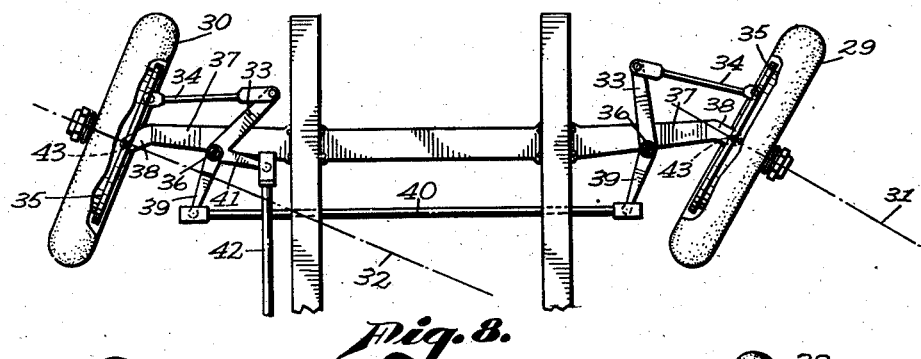
Fig. 8 is a view similar to Fig. 7, showing a modified embodiment and with the wheels swinging to a small angle toward the right; this view particularly illustrates how the steering gear develops a relatively short steering radius for the car for a small steering angle, as in ordinary driving.
Figure 9:
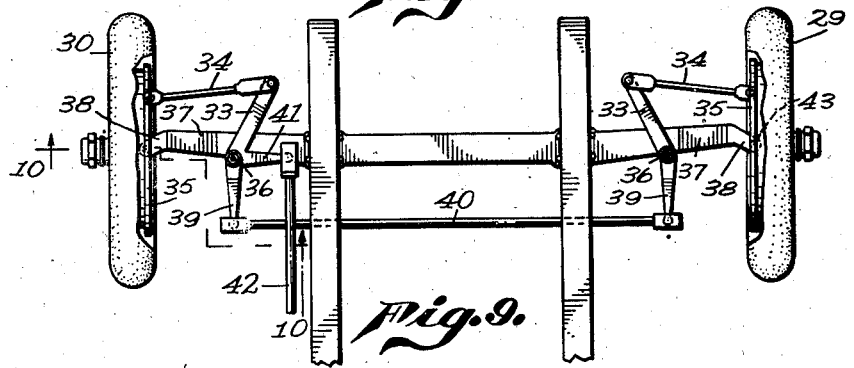
Fig. 9 is a plan of the steering gear shown in Fig. 8, but with the wheels in their neutral position.
Figure 10:
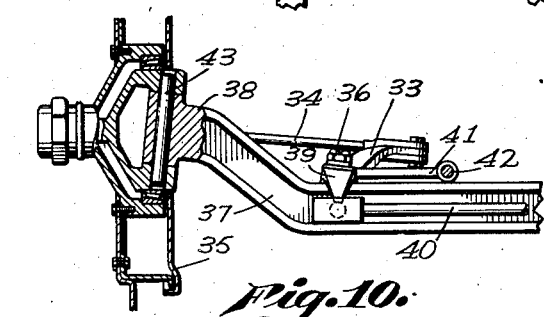
Fig. 10 is a section upon an enlarged scale on the line 10—10 of Fig. 9, with parts broken away and illustrating the wheel mounting and the adjacent actuating parts for this wheel.

In Figs. 7, 8 and 9 we illustrate an embodiment of the invention in which the wheels cannot be moved to such an extreme angle for parking as in the patent referred to above, but the construction shown in these figures immediately develops considerable relative increase of swing of the right wheel as compared with the left for small steering angles, when steering to the right, and vice versa. In other words, for ordinary steering, a relatively short steering radius for the car can be immediately developed for a relatively small turn of the steering wheel. This is particularly illustrated in Fig. 8. Although the front wheels 29 and 30 have been swung through a small angle, it will be noted that the right wheel 29 has moved through a considerably greater angle than the left wheel 30. The turning radius is of course determined by the location of the point of intersection of the lines 31 and 32 that are at right angles to the planes of the wheels. At the same time, the clearances are such in extreme positions of the wheels as indicated in Fig. 7, to permit the car to be parked very handily. With this construction, a short steering radius is quickly established when the driver starts to turn the car and this steering radius rapidly becomes shorter and shorter as it approaches the limit indicated in Fig. 7. This effect is attained by having the actuating levers 33 relatively long and giving them an increased angle of convergence, that is, making their convergence more pronounced.

In this embodiment the links 34 preferably incline rearwardly in an outboard direction, so that the "lever arm" of the link where it attaches to the knuckle-head 35 is relatively shorter than the lever 33. In this embodiment of the invention the increased length for the levers 33 is attained by mounting their pivot-pins 36 at the rear edge of the relatively long inclined extension 37 that connects to the relatively short steering head 38, and the pivot pins 36 are also located further outboard as compared with the corresponding pivots 15 and 16 of Fig. 3 of this application.

The levers 33 are preferably formed with integral rearwardly projecting arms 39 that are preferably substantially parallel with each other and with the longitudinal axis of the car. They are connected by suitable means such as the cross-link 40 for moving the wheels in unison.

The steering movement may be imparted to the actuating links by any suitable means. In the present instance this means is the same as that illustrated in Figs. 1 to 3, involving the use of an arm 41 on the left hand lever 33 connected to the forward end of the drag-link 42. Also, as in the construction illustrated in Figs. 1 to 3, the king-pins 43 that mount the wheels 29 and 30 on the knuckle-heads are preferably substantially in line with the longitudinal axis of the axle. In other words the bent ends of the axle are offset forwardly to maintain this alignment.

It is understood that the embodiment of the invention described herein is only one of the many embodiments this invention may have, and we do not wish to be limited in the practice of the invention, nor in our claims, to the particular embodiment set forth.

What we claim is:

1. In an automobile steering gear, the combination of an axle member having an inclined steering head at each end inclined in a substantially horizontal plane, a knuckle-head at each end of the axle-member having a chamber on its inboard side receiving its corresponding steering head, a wheel mounted on each knuckle-head, means for mounting each knuckle-head at the outer end of its corresponding steering head for rotation on a substantially vertical axis, each inclined steering head operating to increase the angle of swing of the wheel in one direction on said vertical axis, the chamber of each knuckle-head having a lateral width measured from the said vertical axis in the plane of said steering head, greater than the length of the inclined steering head to enable the wheel to swing through a relatively large angle in the other direction, means for connecting the wheels for swinging the same in unison on said vertical axes, and means for imparting steering movement to the above-named parts.

2. In an automobile steering gear, the combination of an axle having bends forming an inclined steering head at each end inclined in a substantially horizontal plane, a knuckle-head at each end of the axle having a chamber on its inboard side receiving its corresponding steering head, a wheel mounted on each knuckle-head, means for mounting each knuckle-head at the outer end of its corresponding steering head for rotation on a substantially vertical axis, each inclined steering head operating to increase the angle of swing of the wheel in one direction on said vertical axis, the chamber of each knuckle-head having a lateral width measured from the said vertical axis in the plane of said steering head, greater than the length of the inclined steering head to enable the wheel to swing through a relatively large angle in the other direction, means for connecting the wheels for swinging the same in unison on said vertical axes, and means for imparting steering movement to the above-named parts.

3. In an automobile steering gear, the combination of an axle having its ends bent to form rearwardly inclined steering heads inclined in a horizontal plane with respect to the longitudinal axis of the axle, a knuckle-head at each end of the axle having a chamber on its inboard side receiving the adjacent inclined steering head, a wheel mounted on each knuckle-head, means for mounting each knuckle-head on the outer end of the corresponding steering head for rotation on a substantially vertical axis, each inclined steering head operating to increase the angle of swing of the wheel in one direction on the said vertical axis, each inclined steering head being shorter than the distance from the said vertical axis to the adjacent face of said chamber to give an increased angle of swing of each wheel on its said vertical axis, in the opposite direction.

4. In an automobile steering gear, the combination of an axle having its ends bent to form rearwardly inclined steering heads inclined in a horizontal plane with respect to the longitudinal axis of the axle, a knuckle-head at each end of the axle having a chamber on its inboard side receiving the adjacent inclined steering head, a wheel mounted on each knuckle-head, means for mounting each knuckle-head on the outer end of its corresponding steering head for rotation on a substantially vertical axis, each inclined steering head operating to increase the angle of swing of the wheel in one direction on the said vertical axis, each inclined steering head being shorter than the distance from the said vertical axis to the adjacent face of said chamber to give an increased angle of swing of each wheel on its said vertical axis, in the opposite direction, said inclined steering heads being offset so that the said vertical axes are located substantially in line with the longitudinal axis of the axle.

5. In an automobile steering gear, the combination of an axle having its ends bent to form rearwardly inclined steering heads inclined in a horizontal plane with respect to the longitudinal axis of the axle, a knuckle-head at each end of the axle having a chamber on its inboard side receiving the adjacent inclined steering head, a wheel mounted on each knuckle-head, means for mounting each knuckle-head on the outer end of its corresponding steering head for rotation on a substantially vertical axis, each inclined steering head operating to increase the angle of swing of the wheel in one direction on the said vertical axis, each inclined steering head being shorter than the distance from the said vertical axis to the adjacent face of said chamber to give an increased angle of swing of each wheel on its said vertical axis, in the opposite direction, an arm corresponding to each wheel having a pivot support on the axle adjacent to the rear edge of the axle, and extending forward, a link connecting each of said arms with its adjacent knuckle-head, a tail-arm rigid with each of said first-named arms and extending rearwardly from the axle, a cross-link connecting said tail-arms, and means for imparting steering movement to the above-named parts.

6. In an automobile steering gear, the combination of an axle having its ends bent to form rearwardly inclined steering heads inclined in a horizontal plane with respect to the longitudinal axis of the axle, a knuckle-head at each end of the axle having a chamber on its inboard side receiving the adjacent inclined steering head, a wheel mounted on each knuckle-head, means for mounting each knuckle-head on the outer end of its corresponding steering head for rotation on a substantially vertical axis, each inclined steering head operating to increase the angle of swing of the wheel in one direction on the said vertical axis, each inclined steering head being shorter than the distance from the said vertical axis to the adjacent face of said chamber to give an increased angle of swing of each wheel on its said vertical axis, in the opposite direction, an arm corresponding to each wheel having a pivot support on the axle adjacent to the rear edge of the axle and extending forward, a link connecting each of said arms with its adjacent knuckle-head, each of said arms having a tail-arm integral therewith and projecting rearwardly from the axle, a pivot for each arm located on said axle, a cross-link connecting said tail-arms, and means for imparting steering movement to said parts.

7. In an automobile steering gear, an axle having its end bent to form an inclined steering head inclined in a substantially horizontal plane with respect to the longitudinal axis of the axle, a knuckle-head mounted on the end of the steering head to swing on a substantially vertical axis, and having a chamber on its inboard side receiving the end of the axle, said inclined steering head being shorter than the horizontal distance of the inner face of said chamber from its said vertical axis to enable said face to clear the inner end of the steering head when the knuckle-head swings inwardly at its forward side on the vertical axis.

8. In an automobile steering gear, an axle member having an inclined steering head at its end inclined in a substantially horizontal plane with respect to the longitudinal axis of the axle member, a knuckle-head mounted on the end of the steering head to swing on a substantially vertical axis, and having a chamber on its inboard side receiving the steering head, said inclined steering head being shorter than the horizontal distance of the inner face of said chamber from its said vertical axis to enable said face to clear the inner end of the steering head when the knuckle-head swings inwardly at its forward side on the vertical axis.

9. In an automobile steering gear, the combination of an axle member having bends forming an inclined steering head at each end inclined in a substantially horizontal plane, a knuckle-head at each end of the axle member having a chamber on its inboard side receiving its corresponding steering head, a wheel mounted on each knuckle-head, means for mounting each knuckle-head at the outer end of its corresponding steering head for rotation on a substantially vertical axis, each inclined steering head operating to increase the angle of swing of the wheel in one direction on said vertical axis, the chamber of each knuckle-head having a lateral width measured from the said vertical axis in the plane of said steering head, greater than the length of the inclined steering head to enable the wheel to swing through a relatively large angle in the other direction, an actuating lever for each wheel having a pivotal support on the axle member, having an arm extending forwardly with means connecting the same to the adjacent knuckle-head to swing the knuckle-head on its said vertical axis, and having a rearwardly extending tail-arm, means connecting said tail-arms to swing the knuckle-heads in unison, and means for imparting steering movement to the above-named parts.

10. In an automobile steering gear the combination of a front axle-member having an inclined steering head at each end inclined in a substantially horizontal plane with respect to the longitudinal axis of the axle-member, a knuckle-head pivotally mounted on each steering head to swing on a substantially vertical axis, an actuating lever pivotally mounted on the axle-member adjacent the rear edge of the axle-member, having a forward arm, a link connecting each forward arm with the adjacent knuckle-head, each actuating lever having a tail-arm, and means connecting said tail-arms to swing the knuckle-heads in unison, said knuckle-heads each having a chamber on its inboard side receiving the adjacent inclined steering head, the inner face of said chamber being located at a greater distance from the said vertical axis of its knuckle-head than the inner end of the steering head to give the wheel an increased angle of swinging movement when the forward side of the knuckle-head swings inwardly.

FRANCIS DU PONT AMMEN.
PAUL EDWARD SCHNEIDER.